(12) United States Patent
Crowley et al.

(10) Patent No.: US 7,580,733 B2
(45) Date of Patent: Aug. 25, 2009

(54) PERSONAL COMMUNICATION DEVICE CONNECTIVITY ARRANGEMENT

(75) Inventors: Robert J Crowley, Sudbury, MA (US); Donald N. Halgren, Manchester, MA (US)

(73) Assignee: AMBIT Corp, Manchester, MA (US)

( * ) Notice: Subject to any disclaimer, the term of this patent is extended or adjusted under 35 U.S.C. 154(b) by 798 days.

(21) Appl. No.: 11/115,020

(22) Filed: Apr. 26, 2005

(65) Prior Publication Data

US 2005/0200536 A1    Sep. 15, 2005

Related U.S. Application Data

(63) Continuation of application No. 09/634,140, filed on Aug. 8, 2000, now Pat. No. 6,885,845, which is a continuation of application No. 08/604,105, filed on Feb. 20, 1996, now Pat. No. 6,594,471, and a continuation-in-part of application No. 09/009,220, filed on Jan. 20, 1998, now Pat. No. 6,112,106, said application No. 08/604,105 is a continuation-in-part of application No. 08/581,065, filed on Dec. 29, 1995, now Pat. No. 5,711,014, and a continuation-in-part of application No. 08/042,879, filed on Apr. 5, 1993, now Pat. No. 5,493,702, said application No. 09/009,220 is a continuation-in-part of application No. 08/581,065, and a continuation-in-part of application No. 08/042,879, application No. 11/115,020, which is a continuation of application No. 08/604,105.

(51) Int. Cl.
  *H04M 1/00*    (2006.01)
(52) U.S. Cl. .............. 455/575.1; 455/90.3; 455/575.5; 455/456.1; 455/106

(58) Field of Classification Search ................ 455/90.3, 455/575.1, 575.5, 575.7, 106, 405, 406, 569.1, 455/569.2, 117, 128, 129, 347, 351, 7, 9; 343/702, 703, 720, 841
See application file for complete search history.

(56) References Cited

U.S. PATENT DOCUMENTS 2,790,899 A    4/1957    Townsend (Continued)

FOREIGN PATENT DOCUMENTS

EP    0 320 913 A3    6/1989

(Continued)

OTHER PUBLICATIONS

Casewell, I., "The Provision of GSM Cellular Radio Environments Within Passenger Aircraft Operating Over Europe," Racal Research Limited, *IEEE Fifth International Conference on Mobile Radio and Personal Communications*, pp. 172-176 (1989)[Abstract].

(Continued)

*Primary Examiner*—Sujatha Sharma
(74) *Attorney, Agent, or Firm*—Don Halgren

(57) ABSTRACT

The present invention comprises a docking system for connecting a portable communication device to a further signal transmission line. The docking system may be arranged within a workstation such as a desk or a tray. The system may also envelope a room in a building or be located in a vehicle, to control and restrict the radiative emission from the communication device and to direct such radiation to a further remote antenna and or signal distribution system connected to the transmission line.

21 Claims, 4 Drawing Sheets

U.S. PATENT DOCUMENTS

| | | |
|---|---|---|
| 3,099,807 A | 7/1963 | Oh |
| 3,364,487 A | 1/1968 | Maheux |
| 3,518,681 A | 6/1970 | Kiepe |
| 3,636,912 A | 1/1972 | Kamp |
| 3,826,935 A | 7/1974 | Grierson et al. |
| 4,167,738 A | 9/1979 | Kirkendall |
| 4,220,955 A | 9/1980 | Frye |
| 4,481,647 A | 11/1984 | Gombert et al. |
| 4,724,766 A | 2/1988 | LaBudde |
| 4,845,738 A | 7/1989 | Takano |
| 5,016,020 A | 5/1991 | Simpson |
| 5,020,149 A | 5/1991 | Hemmie |
| 5,161,168 A | 11/1992 | Schilling |
| 5,161,255 A | 11/1992 | Tsuchiya |
| 5,170,173 A | 12/1992 | Krenz et al. |
| 5,193,219 A | 3/1993 | Tamura |
| 5,243,355 A | 9/1993 | Emmert et al. |
| 5,278,891 A | 1/1994 | Bhagat et al. |
| 5,367,556 A | 11/1994 | Marui et al. |
| 5,392,453 A | 2/1995 | Gudmundson et al. |
| 5,438,610 A | 8/1995 | Bhagat et al. |
| 5,444,762 A | 8/1995 | Frey et al. |
| 5,450,471 A | 9/1995 | Hanawa et al. |
| 5,493,702 A | 2/1996 | Crowley et al. |
| 5,519,761 A | 5/1996 | Gilhousen |
| 5,533,027 A | 7/1996 | Akerberg et al. |
| 5,557,656 A | 9/1996 | Ray et al. |
| 5,557,657 A | 9/1996 | Barnett |
| 5,559,865 A | 9/1996 | Gilhousen |
| 5,577,264 A | 11/1996 | Tuohino |
| 5,670,742 A | 9/1997 | Jones |
| 5,673,053 A | 9/1997 | Marthinsson |
| 5,711,014 A | 1/1998 | Crowley et al. |
| 5,832,380 A | 11/1998 | Ray et al. |
| 5,878,345 A | 3/1999 | Ray et al. |
| 5,878,346 A | 3/1999 | Ray et al. |
| 5,884,166 A | 3/1999 | Ray et al. |
| 5,890,055 A | 3/1999 | Chu et al. |
| 5,924,036 A | 7/1999 | Gustafson |
| 5,953,637 A | 9/1999 | Coons et al. |
| 5,960,343 A | 9/1999 | Ray et al. |
| 5,970,410 A | 10/1999 | Carney et al. |
| 6,014,563 A | 1/2000 | Szabo |
| 6,064,343 A | 5/2000 | Crowley et al. |
| 6,088,592 A | 7/2000 | Doner et al. |
| 6,108,539 A | 8/2000 | Ray et al. |
| 6,112,106 A | 8/2000 | Crowley et al. |
| 6,377,802 B1 | 4/2002 | McKenna et al. |
| 6,408,180 B1 | 6/2002 | McKenna et al. |
| 6,487,187 B1 | 11/2002 | Schmutz et al. |
| 6,594,471 B1 | 7/2003 | Crowley et al. |
| 6,725,035 B2 | 4/2004 | Jochim et al. |
| 6,788,935 B1 | 9/2004 | McKenna et al. |
| 6,885,845 B1 | 4/2005 | Crowley et al. |
| 6,885,864 B2 | 4/2005 | McKenna et al. |
| 7,062,268 B2 | 6/2006 | McKenna |
| 7,107,062 B2 | 9/2006 | Cruz et al. |
| 7,113,780 B2 | 9/2006 | McKenna et al. |
| 7,197,285 B2 | 3/2007 | Crowley et al. |
| 7,400,858 B2 | 7/2008 | Crowley et al. |
| 7,421,253 B2 | 9/2008 | Crowley et al. |
| 2006/0040660 A1 | 2/2006 | Cruz et al. |
| 2006/0276127 A1 | 12/2006 | Cruz et al. |
| 2007/0021117 A1 | 1/2007 | McKenna et al. |
| 2007/0274734 A1 | 11/2007 | Kikuchi |
| 2008/0102812 A1 | 5/2008 | Chari et al. |
| 2009/0023386 A1 | 1/2009 | Crowley et al. |

FOREIGN PATENT DOCUMENTS

| | | |
|---|---|---|
| WO | WO 1994/28684 A1 | 12/1994 |

OTHER PUBLICATIONS

D'Aria, G., et al., "Transmission Techniques for Terrestrial Flight Telephone Systems," *Vehicular Technology Conference, 1990 IEEE 40$^{th,}$* (1990)[Abstract].

Rogard, R., et al., "Prodat Aeronautical Communication System: Overall Architecture and Preliminary Test Results," *IEEE International Conference on Communications: Communications—Sound to Light*, 1: 0513-0519 (1987).

Uhlirz, M., "Concept of a GSM-based Communication System for High-speed Trains," *Vehicular Technology Conference, IEEE 44$^{th}$* Stockholm, Sweden, Jun. 8-10, 1994, pp. 1130-1134 (1994).

Grieco, Donald M., "The Capacity Achievable with a Broadband CDMA Microcell Underlay to an Existing Cellular Macrosystem," *IEEE Journal on Selected Areas in Communications* (12)4:744-750, (May, 1994).

In the United States District Court for the District of Massachusetts, Case 1:09-cv-10217-WGY, Document 33, Ambit Corporation v. Delta Air Lines, Inc. And Aircell LLC, Delta Air Lines, Inc.'s Initial Disclosures, filed May 11, 2009.

In the United States District Court for the District of Massachusetts, Case 1:09-cv-10217-WGY, Document 34, Ambit Corporation v. Delta Air Lines, Inc. And Aircell LLC, Aircell LLC's Initial Disclosures, filed May 11, 2009.

"Request for *Inter Partes* Reexamination," in re U.S. Patent No. 7,400,858, pp. 1-235, filed May 29, 2009.

Jahn, A., et al., "Evolution of Aeronautical Communications for Personal and Multimedia Services," *IEEE Communications Magazine*, pp. 36-43, (Jul., 2003).

Papavramidis, A.C., et al., "Adaptation of Land Mobile Systems for Onboard Operation," ICUPC Conference Proceedings, pp. 258-263, (Oct. 15, 1993).

Dennis, T.L., "On the phone at 30,000 feet," *Aerospace America*, pp. 1-3 and 58-60 (Jun., 1985).

European Telecommunications Standards Institute, ETR 056: Radio Equipment and Systems (RES); Digital European Cordless Telecommunications (DECT) System Description Document, (Jul., 1993).

Woolnough, R., "U.K. Firm Develops Wireless Laptop, PDA Links," *Electronic Engineering Times*, (Oct. 25, 1993).

Eskedal, B. E., "The DECT System," *Telekktronik*, 91(4): 25-29, 4$^{th}$ Quarter 1995.

European Telecommunications Standards Institute, Release Note, Recommendation GSM 05.08- DCS, (Feb., 1992).

European Telecommunications Standards Institute, GSM 05.08-DCS: European Digital Cellular Telecommunication System (Phase 1): Radio Sub-System Link Control, (Feb. 1992).

WirelessCabin Press Release, "Internet and mobile telephony above the clouds: WirelessCabin demonstrates GSM and multimedia services on Airbus 340," (Sep. 20, 2004).

PERSONAL COMMUNICATION DEVICE CONNECTIVITY ARRANGEMENT

This application is a continuation application of Ser. No. 09/634,140, filed Aug. 8, 2000, now U.S. Pat. No. 6,885,845 issued Apr. 26, 2005, which is a continuation of application Ser. No. 08/604,105 filed Feb. 20, 1996 now U.S. Pat. No. 6,594,471 and a continuation-in-part of Ser. No. 09/009,220 filed Jan. 20, 1998, now U.S. Pat. No. 6,112,106 which are CIP's of Ser. No. 08/581,065 filed Dec. 29, 1995, now U.S. Pat. No. 5,711,014 and Ser. No. 08/042,879 filed Apr. 5, 1993, now U.S. Pat. 5,493,702, each incorporated herein by reference.

This Application is also a continuation application of our U.S. patent application Ser. No. 08/604,105 filed Feb. 20, 1996, now U.S. Pat. No. 6,594,471, issued Jul. 15, 2003, and our U.S. patent application Ser. No. 09/634,140 filed Aug. 8, 2000, now U.S. Pat. No. 6,885,845, issued Apr. 26, 2005, and is a brother application of Ser. No. 10/619,770, now allowed, each of which applications are incorporated by reference in their entirety.

BACKGROUND OF THE INVENTION (1) Field of the Invention

This invention relates to a docking system for handheld electronic communication devices such as cellular telephones or the like, for use with structures or vehicles, and is a Continuation-In-Part Application of U.S. patent application, Ser. No. 08/581,065, filed Dec. 29, 1995, which is a Continuation-In-Part Application of our allowed co-pending U.S. patent application Ser. No. 08/042,879, filed Apr. 5, 1993, each being incorporated herein by reference, in their entirety.

(2) Prior Art

Extraneous radio frequency emission has become a serious concern of hand-held electronic communication devices such as portable facsimile machines, ground position indicators, and cellular telephone manufacturers and users alike. RF radiation is considered a potential carcinogen.

The proliferation of these hand-held devices is evident everywhere. A single hand-held device however, should able to travel with its owner and be easily transferably usable in automobiles, planes, cabs or buildings (including hospitals) as well as at offices and at desks with no restrictions on their use, and without causing concern with regard to the radiation therefrom. The hand-held devices should be portable for a user to carry in his pocket, yet be able to use that same cellular unit in such vehicle or building while minimizing such radiational effect therein.

It is an object of the present invention to permit a user of a portable hand-held electronic communication device such as a cellular telephone or the like, to conveniently use that same hand-held device/cellular phone in an automobile, plane or building, office/desk, or anywhere signal transmission is needed, and to permit such signal to reach its intended destination such as a communications network or satellite, without interfering with other electrical equipment and in spite of interfering walls of buildings or structure and/or other electrical equipment.

It is a further object of the present invention to minimize any radiation from such a portable device, such as a cellular telephone or the like, while such use occurs in an automobile, a building or an elevator, an airplane, a cab, or other public facility in which the user wishes to minimize his own exposure to stray radiation, and also to permit re-transmission of his signal, to avoid the necessity of connecting and disconnecting cables, and to permit a wide variety of cellular telephones such as would be utilized in a rental car where various manufactures' phones would be used, and to permit control of such re-transmission of signals where desired, so as to allow user/customer billing and monitoring thereof.

BRIEF SUMMARY OF THE INVENTION

The present invention comprises a docking system adaptable to an automobile, plane, building or desk for receipt of an electronic communication device such as a cellular telephone, portable computer, facsimile machine, pager or the like, to permit a user safe, environmentally safe, non-touching, radiationally communicative mating of the antenna of that device to a further transmission line through a juxtaposed pick-up probe, the signal coming in or going out through a communications network or further remote antenna.

The docking system may comprise a "zone" or "focal area" as a generally rectilinear area/volume on/in a desk or work surface on/in which the electronic communication device may be placed, such a surface or space being possible on a desk, or in a plane. That focal area may also, in a further embodiment, be comprised of one or more rooms in a building, such focal area having a pick-up probe thereat, in conjunction with a shield placed on/in the desk, room, vehicle or building to prevent the radiation from that communication device from traveling in any undesired directions within the desk, room, vehicle or building.

The focal area may be defined by a metal walled structure within or on which a broadband probe is arranged. The metal walled structure acts as a shield to minimize radiation from the communication device from passing therethrough. In a first embodiment, the shield may be comprised of a partial housing disposed within the upper work surface of a desk. The probe would be elongatively disposed within the partial housing and be in electrical communication with a transmission line such as coax cable, waveguide, or the like. The partial housing may have a planar dielectric layer thereover, which would also be co-planar with the surface of the desk. The communication device would be placed within the pickup zone of the focal area, and would be able to transmit and receive signals through the dielectric layer. The partial housing would act as the shield in the desk, to minimize radiation by the worker at the desk. In a further embodiment, the housing may be comprised of a thin, generally planar mat of conductive material, which mat may be flexible and distortable, for conformance to a particular work surface and for ease of storage capabilities. The mat has an upper layer of dielectric material (for example, plastic, foam or the like). A thin, flat, conformable coupling probe may be embedded into or printed onto the upper surface of the dielectric material. The mat may be utilized as a portable focal area for placement of a communication device thereon, or wrapped up in an enveloping manner therein.

A yet further embodiment of the present invention includes a control unit in the transmission line from the pickup probe to the further remote antenna. The control unit may comprise a filter or switch connected to a computer. The computer may accumulate billing information, control system functions, or act as a regulator for multiple users of antenna coupling system.

The invention thus comprises a docking system for connecting a portable communication device to a further signal transmission line, the portable communication device having an externally radiative antenna, the system comprising a shield for restricting at least a portion of any radiation from the externally radiative antenna of said portable communication device, and a coupling probe mounted adjacent to the shield for radiatively coupling between the externally radiative antenna of the portable communication device and the further signal transmission line via radio frequency energy therebetween. The shield may be comprised of an electrically conductive material, or an attenuative material capable of blocking at least part of the radiofrequency radiation energy coming from the communication device(s) connected thereto. The shield defines a focal area for receipt and transmission of a radio frequency signal, when a communication device is placed within the focal area. The focal area or zone, may be selected from the group of structures consisting of a desk, a room in a building, or a tray or the like in a vehicle. The further signal transmission line may be connected to a further communication network and/or a further antenna connected to the transmission line, yet positioned at a location remote from the shield. The transmission line may have a control unit therein, the control unit being arranged to permit regulation of signals being transmitted through the transmission line. The control unit may comprise a computer arranged to monitor time or use of the docking system. The shield and the probe may be spaced apart by a dielectric material. The shield, the probe and the dielectric material may be flexible. The communication device may include at least two cellular telephones (or other portable communication devices) simultaneously connected to the remote antenna.

The invention also includes a method of coupling a portable communication device having an externally radiative antenna, to a signal transmission line having a further remote antenna thereon, for the purpose of effecting radio signal transmission therebetween, the method comprising the steps of arranging a radiation shield in juxtaposition with at least a portion of said radiative antenna of the portable communication device, mounting a coupling probe adjacent the shield and in communication with the signal transmission line, and placing the externally radiative antenna of the portable communication device close to the probe and the shield so as to permit radiative communication between the externally radiative antenna and the signal transmission line via the coupling probe. The method may include arranging the shield in or on a generally planar work surface so as to restrict the propagation of at least a portion of the radiation emanating from the communication device primarily only to the vicinity of the probe. The method may include attaching a control unit to the transmission line to permit regulation of electric signals therethrough, and adding a further communication device in juxtaposition with a further probe, the further probe also being in electronic communication with that control unit, so as to permit multiple simultaneous use of the transmission line and communication system and/or remote antenna therewith. The method of coupling the portable communication device to the signal transmission line, may also include the step of billing any users of the communication and/or remote antenna by monitoring and tabulating any signals received by and sent through the control unit.

It is an object of the present invention to provide a shielded antenna docking arrangement, which itself may be portable, for use with a portable communication device such as a cellular telephone, facsimile machine or ground position indicator or the like, such use occurring in a vehicle such as a plane, an automobile or a cab or in a public or private building, office desk or elevator.

BRIEF DESCRIPTION OF THE DRAWINGS

The objects and advantages of the present invention will become more apparent when viewed in conjunction with the following drawings in which:

FIG. 1b is a partial view taken along the lines A-A of FIG. 1a;

FIG. 2b is a view taken along the lines B-B of FIG. 2a;

FIG. 3b is a block diagram of a further embodiment of that shown in FIG. 3a.

DESCRIPTION OF THE PREFERRED EMBODIMENTS

Figure 1A:
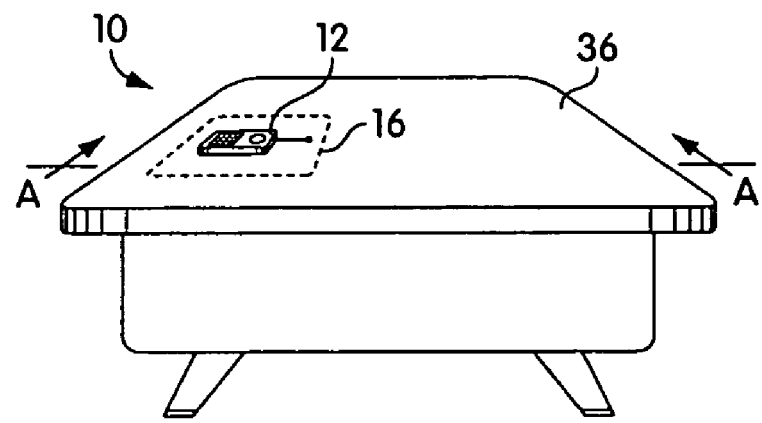
FIG. 1a is a perspective view of a focal area docking arrangement, as may be utilized with a desk.

Referring now to the drawings in detail, and particularly to FIG. 1a, there is shown a portable communication device docking arrangement 10, to permit a portable communication device such as a hand-held cellular telephone 12 to be utilized thereon, such as on a desk 14 or adjacent to it, and as a personal communicator (i.e. cellular telephone, facsimile machine, pager or the like) which may also be carried on an individual.

Such a docking system 10 of the present invention may also be adaptable to an automobile, plane, or building for providing radiationally restrictive communication between a portable electronic communication device 12 such as a cellular telephone, portable computer, facsimile machine, pager, or the like, while allowing communicative mating of the radiative antenna of that device to a further transmission line and communication system and/or a more remote antenna, as recited and shown in our aforementioned patent applications, incorporated herein by reference in their entirety.

The docking system 10 may comprise a "zone" or "focal area" 16 as a rectilinear area/volume on/in a desk 14 or work surface on/in which the electronic communication device 12 may be placed, such a surface or space being in a structure such as an airplane. That focal area 16 has a pick-up coupling probe 22 thereat, as shown for example in FIG. 1b, in conjunction with a shield 24 placed on/in the desk 14, (or room, vehicle or building, as shown in FIGS. 3a and 3b), to prevent the radiation (electromagnetic/microwave) emanating from that communication device 12 from traveling in any undesired directions within the desk, room, vehicle or building.

Figure 1B:
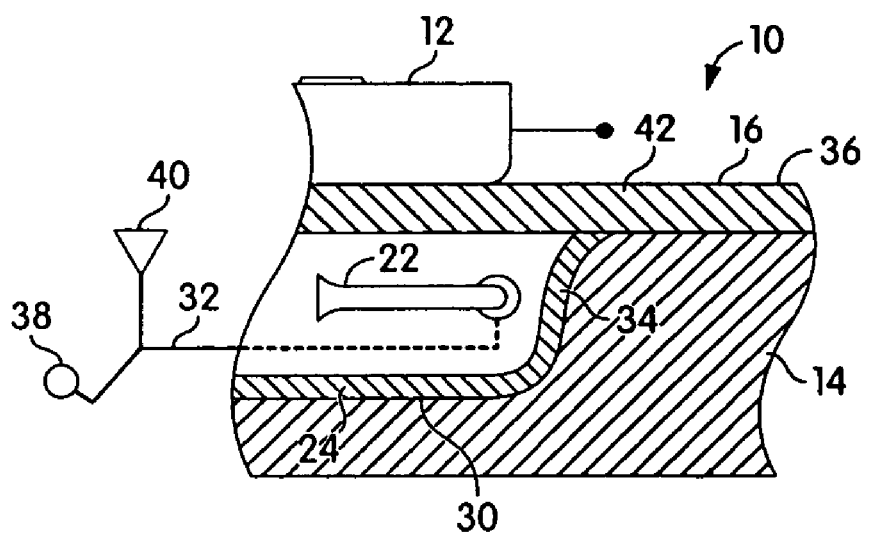

The focal area 16 may be defined by a metal walled housing structure 30 within which a broadband probe 22 is arranged, as shown in FIG. 1b. The metal walled structure 30 acts as a shield to minimize undesired radiation from the communication device 12 from passing therethrough. In a first embodiment, the shield may be comprised of a partial housing 34 disposed within the upper work surface 36 of a desk 14, as may be seen in FIG. 1b. The pick-up probe 22 would be elongatively disposed within the partial housing structure 30 and be in electrical communication with a transmission line 32 such as coaxial cable, waveguide, or the like. The transmission line 32 would be in electrical communication with an electric communications network or distribution system 38, and/or to a further remote antenna 40, such as may be seen in FIGS. 1b, 3a and 3b. The partial housing 30 may have a planar dielectric layer 42 thereover, which would also be co-planar with the surface of the desk 14. The communication device 12 would be placed within the pickup zone of the focal area 16, and would be able to transmit and receive signals through the dielectric layer 42. The partial housing 30 would act as the shield in the desk, to minimize radiation directed towards the worker(s) at the desk.

Figure 2A:
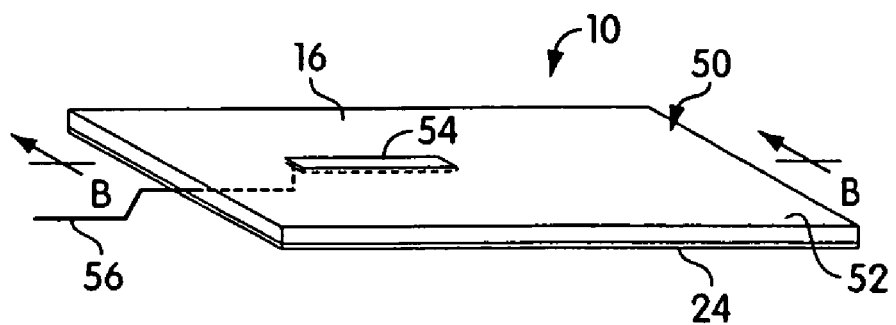
FIG. 2a is a perspective view of a portable focal area docking system for portable communication devices.
Figure 2B:
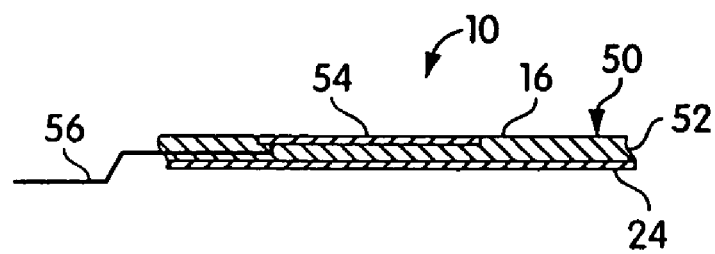

In a further embodiment as shown in FIG. 2a, the shield or housing may be comprised of a thin, generally planar mat 50 of conductive material, which mat 50 may be flexible and distortable, for conformance to any surface (human or otherwise), and may be folded or rolled up to minimize storage requirements. The mat 50 has an upper layer 52 made of a dielectric material (plastic, foam or the like). A thin, flat, conformable coupling probe 54 is embedded into or printed onto the upper surface of the layer of dielectric material 52. The mat 50 may be utilized as a portable focal area for placement of a communication device thereon, or wrapped-up in an enveloping manner therein. The probe 54 is connected to a transmission line 56, in electrical contact with a network or remote antenna, not shown in this figure.

Figure 3A:
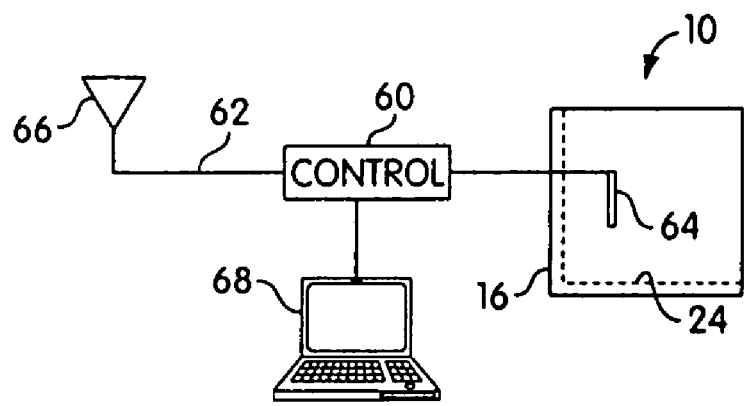
FIG. 3a is a block diagram of a docking system having a sensor unit arranged therewith.
Figure 3B:
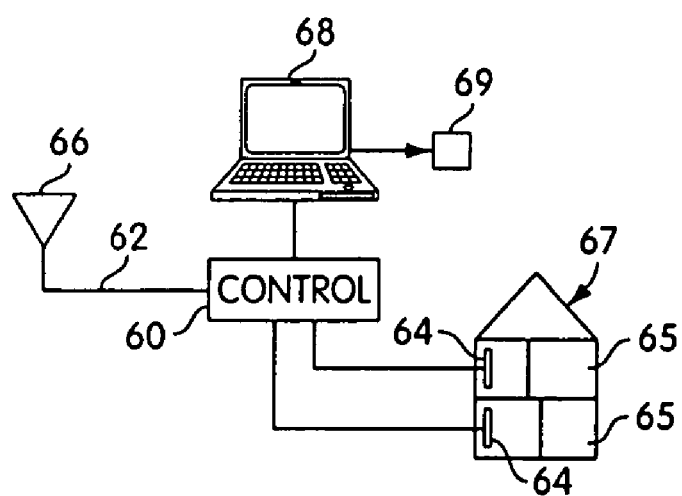

A yet further embodiment of the present invention includes a control unit 60, connected into the transmission line 62 from the pickup probe 64 to the further remote antenna 66 shown in FIGS. 3a and 3b. The control unit 60 may comprise a filter, switch, amplifier, attenuator, combiner, splitter, or other type of frequency converter, connected to a computer 68. The computer 68 may be arranged to accumulate customer or billing information by functioning with a processor to print out use-data 69, to maintain frequency control functions, or to act as a regulator for multiple users of the antenna coupling system 10. There may be a plurality of pickup coupling probes 64 each connected to the control unit 60 and the transmission line 62, one probe 64 in each of a plurality of shielded rooms 65, each wall or work area (desk) having a shield, the rooms 65 shown in a building 67, in FIG. 3b.

Figure 4:
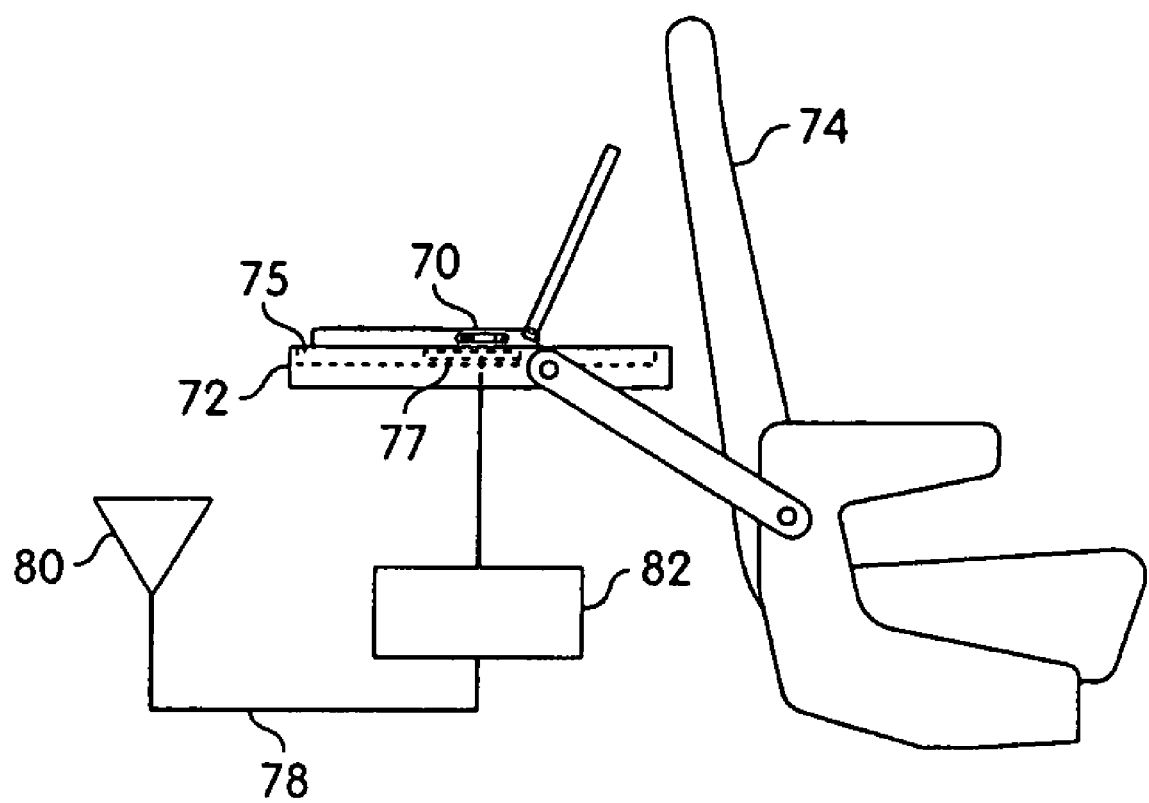
FIG. 4 is a side elevational view of a docking system, as it may be utilized in a vehicle.

The view shown in FIG. 4, displays a portable communication device such as a facsimile machine or computer 70 supported on a tray 72 articulably mounted on the back of an airplane seat 74. The tray 72 has a "focal area" 75 therewithin, as represented by the dashed lines 76. The focal area 75 includes a conductive (preferably metallic) shield arranged beneath and partially surrounding a broadband probe 77. The probe 77 transmits electrical signals radiated to and from a radiative antenna on or in the base of the portable communication device 70. A transmission line 78 which may be comprised of coaxial cable, waveguide, or optical fibers, extends from the probe within the focal area, to a further remote antenna 80 mounted outside of the structure, which here, is identified as an airplane.

A control unit 82, such as attenuators, heterodyne converters, amplifiers, bandpass filters, switches, or the like, may be arranged in communication with the transmission line 78 to monitor or control the time in the vehicle in which the communication device may be utilized, for example, to limit certain times when such devices may be utilized in an airplane, or to modulate the signal being transmitted or received by the remote antenna, and/or to monitor usage of the docking system for subsequent billing of those users.

Thus what has been shown is a unique system for minimizing the detrimental effects of radiation from common portable communication devices to their users, while improving the transmission capabilities and customer usage of such devices, overcoming the barriers such as buildings and vehicles in which such devices might otherwise be utilized, that would interfere with the flow of signals transmitted.

We claim:

1. An rf signal sending and receiving arrangement for a personal communication device arranged wirelessly within an rf restricted environment, comprising:

providing a personal communication device with a radiative antenna;

placing a first antenna arrangement within said rf restricted environment;

placing a second antenna outside of said rf restricted environment;

connecting said first antenna arrangement within said rf restricted environment with said second antenna outside of said rf restricted environment by a computer controlled circuit arranged therebetween;

energyzing said personal communication device to enable wireless communication of a signal by said personal communication device within said rf restricted environment; and controlling any wirelessly communicated signal within said rf restricted environment by said computer arranged in said circuit between said first antenna arrangement and said second antenna.

2. The rf signal sending and receiving arrangement for a personal communication device in an rf restricted environment as recited in claim 1, including:

limiting the time any communicative signal communicates wirelessly with said personal communication device.

3. The rf signal sending and receiving arrangement for a personal communication device in an rf restricted environment as recited in claim 1, including:

billing a user of said personal communication device for any use of said personal communication device within said rf restricted environment.

4. The rf signal sending and receiving arrangement for a personal communication device in an rf restricted environment as recited in claim 1, including:

communicating with said second antenna outside of said rf restricted environment through a communications satellite.

5. The rf signal sending and receiving arrangement for a personal communication device in an rf restricted environment as recited in claim 1, wherein said personal communication device is a cell phone.

6. The rf signal sending and receiving arrangement for a personal communication device in an rf restricted environment as recited in claim 1, wherein said personal communication device is a laptop computer.

7. The rf signal sending and receiving arrangement for a personal communication device in an rf restricted environment as recited in claim 1, wherein said rf restricted environment is a vehicle.

8. The rf signal sending and receiving arrangement for a personal communication device in an rf restricted environment as recited in claim 1, wherein said rf restricted environment is a building.

9. The rf signal sending and receiving arrangement for a personal communication device in an rf restricted environment as recited in claim 1, including:

applying an rf shielding to at least a portion of said rf restricted environment.

10. The rf signal sending and receiving arrangement for a personal communication device in an rf restricted environment as recited in claim 1, including:

modulating said signal traversing said circuit between said first antenna and said second antenna.

11. The rf signal sending and receiving arrangement for a personal communication device in an rf restricted environment as recited in claim 1, wherein said first antenna arrangement comprises a plurality of antennae.

12. A method of providing wireless rf communication to a personal communication in an rf restricted environment, said personal communication device having a radiative antenna, said method comprising;
  installing an rf energy shield in at least a portion of said rf restricted environment to shield electromagnetic radiation to and from said personal communication device from traveling undesirably within that rf restricted environment;
  providing a first antenna within said rf restricted environment;
  connecting said first antenna to a second antenna arranged on the outside of said rf restricted environment through a computer controlled circuit arranged therebetween;
  wirelessly connecting said first antenna with said radiative antenna of said personal communication device within said rf restricted environment;
  monitoring communications of said personal communication device by a computer within said computer controlled circuit at any point between said first antenna and said second antenna; and
  controlling the use of said personal communication device within said rf restricted environment.

13. The method of providing wireless rf communication to a personal communication device in an rf restricted environment, as recited in claim 12, including:
  limiting the amount of time when such personal communication device may be utilized in said rf restricted environment.

14. The method of providing wireless rf communication to a personal communication device in an rf restricted environment, as recited in claim 12, including:
  billing for the use of said personal communication device within said rf restricted environment.

15. The method of providing wireless rf communication to a personal communication device in an rf restricted environment, as recited in claim 12, wherein said personal communication is a cellular telephone.

16. The method of providing wireless rf communication to a personal communication device in an rf restricted environment, as recited in claim 12, wherein said personal communication is a laptop computer.

17. The method of providing wireless rf communication to a personal communication device in an rf restricted environment, as recited in claim 12, wherein said rf restricted environment is a building.

18. A method of providing wireless rf communication to a personal communication device in an rf restricted environment, said personal communication device having a radiative antenna, said method comprising;
  providing a first antenna within said rf restricted environment;
  connecting said first antenna to a second antenna arranged on the outside of said rf restricted environment through a computer controlled circuit connected therebetween;
  wirelessly connecting said first antenna with said radiative antenna of said personal communication device within said rf restricted environment;
  monitoring communications of said personal communication device by a computer arranged at any point of said computer controlled circuit between said first antenna and said second antenna;
  modulating the signal received from said radiative antenna of said personal communication device; and
  sending said modulated signal of said personal communication device through said second antenna outside of said rf restricted environment.

19. The method as recited in claim 18, of providing wireless rf communication to a personal communication device in an rf restricted environment, said personal communication device having a radiative antenna, including:
  controlling the amount of time when such personal communication device may be utilized in said rf restricted environment through said computer in said computer controlled circuit; and
  billing for use of said personal communication device within said rf restricted environment.

20. The method as recited in claim 18, of providing wireless rf communication to a personal communication device in an rf restricted environment, said personal communication device having a radiative antenna, including:
  permitting use of multiple personnel communication devices by said computer controlled circuit arranged between said first antenna arranged within said rf restricted environment and said second antenna arranged on the outside of said rf restricted environment.

21. The method, as recited in claim 18, of providing wireless rf communication to a personal communication device in an restricted environment, said personal communication device having a radiative antenna, including:
  communicating with an outside communications network by said second antenna.

* * * * *

(12) INTER PARTES REEXAMINATION CERTIFICATE (0300th)
United States Patent
Crowley et al.

(10) Number: US 7,580,733 C1
(45) Certificate Issued: Sep. 6, 2011

(54) PERSONAL COMMUNICATION DEVICE CONNECTIVITY ARRANGEMENT

(75) Inventors: Robert J Crowley, Sudbury, MA (US); Donald N. Halgren, Manchester, MA (US)

(73) Assignee: Ambit Corporation, Manchester, MA (US)

Reexamination Request:
No. 95/001,227, Aug. 25, 2009

Reexamination Certificate for:
Patent No.: 7,580,733
Issued: Aug. 25, 2009
Appl. No.: 11/115,020
Filed: Apr. 26, 2005

Related U.S. Application Data

(63) Continuation of application No. 09/634,140, filed on Aug. 8, 2000, now Pat. No. 6,885,845, which is a continuation of application No. 08/604,105, filed on Feb. 20, 1996, now Pat. No. 6,594,471, and a continuation-in-part of application No. 09/009,220, filed on Jan. 20, 1998, now Pat. No. 6,112,106, said application No. 08/604,105, and a continuation-in-part of application No. 08/581,065, filed on Dec. 29, 1995, now Pat. No. 5,711,014, and a continuation-in-part of application No. 08/042,879, filed on Apr. 5, 1993, now Pat. No. 5,493,702, said application No. 09/009,220, and a continuation-in-part of application No. 08/581,065, and a continuation-in-part of application No. 08/042,879, said application No. 11/115,020, filed on Apr. 26, 2005, is a continuation of application No. 08/604,105.

(51) Int. Cl.
*H04M 1/00* (2006.01)

(52) U.S. Cl. .............. 455/575.1; 455/90.3; 455/456.1; 455/575.5; 455/106

(58) Field of Classification Search .................. None
See application file for complete search history.

(56) References Cited

U.S. PATENT DOCUMENTS 2,257,094 A 9/1941 Goldstine
2,790,899 A 4/1957 Townsend
3,099,807 A 7/1963 Oh
3,323,063 A 5/1967 Walker
3,364,487 A 1/1968 Maheux
3,518,681 A 6/1970 Kiepe
3,636,912 A 1/1972 Kamp
3,826,935 A 7/1974 Grierson et al.
4,167,738 A 9/1979 Kirkendall
4,193,076 A 3/1980 Ito et al.
4,220,955 A 9/1980 Frye
4,419,766 A 12/1983 Goeken et al.
4,481,647 A 11/1984 Gombert et al.
4,724,766 A 2/1988 LaBudde
4,740,794 A 4/1988 Phillips et al.
4,850,006 A 7/1989 Sasaki et al.
4,903,326 A 2/1990 Zakman et al.
5,016,020 A 5/1991 Simpson
5,020,149 A 5/1991 Hemmie
5,040,237 A 8/1991 Barnes et al.
5,048,117 A 9/1991 Aisaka et al.

(Continued)

FOREIGN PATENT DOCUMENTS

EP 0320913 A3 6/1989
WO 9717792 5/1997

OTHER PUBLICATIONS

Hoppe, Geoffrey A. "Airborne cellular Flight Tests Successful" Air Cell News Release, Apr. 26, 1983, Air Cell Inc., Dallas, Texas.

Air Cell Inc. brochure, Copyright 1995, Dallas, Texas.

(Continued)

*Primary Examiner*—Roland Foster

(57) ABSTRACT

The present invention comprises a docking system for connecting a portable communication device to a further signal transmission line. The docking system may be arranged within a workstation such as a desk or a tray. The system may also envelope a room in a building or be located in a vehicle, to control and restrict the radiative emission from the communication device and to direct such radiation to a further remote antenna and or signal distribution system connected to the transmission line.

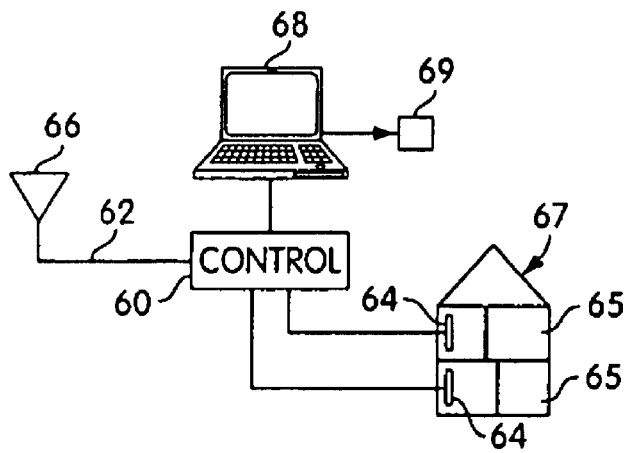

U.S. PATENT DOCUMENTS

| | | | |
|---|---|---|---|
| 5,084,864 A | 1/1992 | Turnbull et al. |
| 5,161,255 A | 11/1992 | Tsuchiya |
| 5,170,173 A | 12/1992 | Krenz et al. |
| 5,173,594 A | 12/1992 | McClure |
| 5,243,355 A | 9/1993 | Emmert et al. |
| 5,276,686 A | 1/1994 | Ito |
| 5,335,366 A | 8/1994 | Daniels |
| 5,336,896 A | 8/1994 | Katz |
| 5,357,262 A | 10/1994 | Blaese |
| 5,367,556 A | 11/1994 | Marui et al. |
| 5,438,610 A | 8/1995 | Bhagat et al. |
| 5,440,315 A | 8/1995 | Wright et al. |
| 5,444,762 A | 8/1995 | Frey et al. |
| 5,493,702 A | 2/1996 | Crowley et al. |
| 5,519,761 A | 5/1996 | Gilhousen |
| 5,532,703 A | 7/1996 | Stephens et al. |
| 5,533,027 A | 7/1996 | Åkerberg et al. |
| 5,557,656 A | 9/1996 | Ray et al. |
| 5,592,539 A | 1/1997 | Amarant et al. |
| 5,668,561 A | 9/1997 | Perrotta et al. |
| 5,670,742 A | 9/1997 | Jones |
| 5,711,014 A | 1/1998 | Crowley et al. |
| 5,774,789 A | 6/1998 | van der Kaay et al. |
| 5,822,705 A | 10/1998 | Lehtola |
| 5,832,380 A | 11/1998 | Ray et al. |
| 5,878,345 A | 3/1999 | Ray et al. |
| 5,884,166 A | 3/1999 | Ray et al. |
| 5,890,055 A | 3/1999 | Chu et al. |
| 5,898,408 A | 4/1999 | Du |
| 5,940,038 A | 8/1999 | Brown |
| 5,960,343 A | 9/1999 | Ray et al. |
| 5,995,050 A | 11/1999 | Moller et al. |
| 6,006,090 A | 12/1999 | Coleman et al. |
| 6,014,546 A | 1/2000 | Georges et al. |
| 6,064,343 A | 5/2000 | Crowley et al. |
| 6,069,592 A | 5/2000 | Wass |
| 6,112,106 A | 8/2000 | Crowley et al. |
| 6,594,471 B1 | 7/2003 | Crowley et al. |
| 6,885,845 B1 | 4/2005 | Crowley et al. |

OTHER PUBLICATIONS

The National Telesystems Conference, Nov. 7–10, 1982, IEEE Catalog No. 82CH1824–2, Armstrong et al., "Space shuttle wireless crew communications".

Black, Norman, "Placing computers in the Air and in Hotel Rooms" The Associated Press, Oct. 3, 1982, Sunday AM Cycle.

Fifth International Conference on Mobile and Personal Communications, Conference Publication No. 315, Dec. 11–14, 1989, Casewell, "The Provisions of GSM Cellular Radio Environment within Passenger Aircraft Operating over Europe".

35th IEEE Vehicular Technology Conference, May 21–23, 1995, Colorado CHILD, "Air–to–Ground Propagation at 900MHZ".

Electronics World, Aug. 1969, Communications on the Moon.

Aerospace America, Jun. 1985, Special Section, Aerospace mobile communications building the mass market, Feldman, "Technological advances are expected to lower mobile satellite communications hardware and services costs".

Foley, Robert, "Aircell, It's Time Now" Avionics News, Mar. 1996.

Aviation Week and Space Technology, Feb. 22, 1982, Klass, "In–Flighht Telephone Offers Direct Dialing Nationally".

National Space Transportation System Reference, vol. 1, Systems and Facilities, NASA, Jun. 1988.

NASA STS–2 Second Space Shuttle Mission, Press Kit, Sep. 1981.

NASA STS–3 Third Space Shuttle Mission, Press Kit, Mar. 1982.

Final Report for the Wireless Microphone Communication System Telephonics for the Space Shuttle Orbiter, Jan. 1, 1980.

Suzuki et al., System Integration of Land, Maritime, Aeronautical Mobile Telephone Services, IEEE 1985.

Thurber et al., "Airborne cellular service signals airfone revolution" Aviation International News, Oct. 1, 1995, vol. 27, No. 18.

1994 IEEE 44th Vehicular Technology Conference, Stockholm, Jun. 8–10, 1994, vol. 2, Uhlirz, "Concept of a GSM–based Communication System for High–Speed Trains".

White, "Air–Ground Communications: History and Expectations" IEEE Transactions on Communications, vol. 21, No. 5, May 1973.

Joint claim Construction and Pre hearing Statement, Doc. DI69, Filed Aug. 21, 2009.

Airfone, Purchase Specifications Book, Jun. 10, 1985.

Balanis, "Attenna Theory Analysis and Design" Second Edition, Copyright 1982, 1997, John Wiley & Sons Chapters 1, 2, 4 and 5.

NASA, National Space Transportation System Reference, vol. 1, Systems and Facilities, Jun. 1988.

Bushell, A.T.J., "Airborne telephones: background and the European position," IEEE Xplore Digital Library, Mar. 17, 1992.

Report of the Presidential Commission on the Space Shuttle Challenger Accident, vol. 3, Appendix O–NASA Search, Recovery and Reconstruction Task Force Team Report, Jun. 6, 1986, Washington, D.C.

Plaintiff Ambit Corporation's Preliminary Markman Brief D.I. 43 filed Aug. 4, 2009.

Declaration of Stephanie P. Kph in Support of Defendant's Reply Memorandum in Support of Their Motion for Summary Judgement of Invalidity for Failure to Comply with 36 U.S.C. § 112 (D.I. 63).

Defendants' Response to Plaintiff's Counter–Statement of Material Facts (D.I. 64).

Declaration of Benjamin P. Hurwitz, Esq. in Support of Plaintiff Ambit Corporation's Preliminary Markman Brief (D.I. 44).

Declaration of D. Richard Brown, Ph. D. in support of Ambit Corporaton's Preliminary Markman Brief (D.I. 45).

Second Declaration of Benjamin P. Hurwitz, Esq. in Support of Plaintiff Ambit Corporation's Reply Markman Brief (D.I. 60).

Plaintiff Ambit Corporation's Reply Brief to Defendants' Opening Claim Constructon Brief (D.I. 59).

Defendants' Opening Claim Construction Brief (D.I. 41).

Declaration of Stephanie P. Koh in Support of Defendants' Opening Claim Construction Brief (D.I. 42).

Defendants' Reply Claim Construction Brief (D.I. 56).

Declaration of Stephanie P. Koh in Support of Defendants' Reply Claim Construction Brief (D.I. 57).

Declaration of William R. Michalson (D.I. 58).

Defendants' Motion for Summary Judgment of Invalidity for Failure to Comply with 35 U.S.C. §112 (D.I. 36).

Defendants' Memorandum in Support of Their Motion for Summary Judgement of Invalidity for Failure to Comply with 35 U.S.C. §112 (D.I. 37).
Defendants' Local Rule 56.1 Statement of Material Facts as to Which There is no Genuine Dispute (D.I. 38).
Declaration of Stephanie P. Koh in Support of Defendants' Motion for Summary Judgement of Invalidity for Failure to Comply with 35 U.S.C. §112 (D.I. 39).
Plaintiff's Opposition to Defendants' Motion for Summary Judgement on Ground of Invalidity under 35 U.S.C. §112 (D.I. 50).
Plaintiff's Response to Defendants' Statement and Counter–Statement of Material Facts as to Which There Exists Genuine Issues to Be Tried (D.I. 51).
Declaration of David Starobinski, P.h.D. in Support of Plaintiff Ambit Corporation's Opposition to Defendants' Motion for Summary Judgement (D.I. 52).
Defendants' Reply Memorandum in Support of Their Motion for Summary Judgement of Invalidity for Failure to comply with 35 U.S.C. §112 (D.I. 62).
Order from the United States District Court, Jan. 22, 2010, District of Massachusetts in Civil Action No. 09–10217–WGY.
Defendants' Reply in Support of Their Motion for Summary Judgement of Noninfringement, or in the Alternative, Invalidity (D.I. 133).
Plaintiff's Memorandum in Opposition to Defendant's Motion for Summary Judgement of Non–Infringement, or in the Alternative, Invalidity (D.I. 125).
Defendants' Memorandum in Support of Their Motion for Summary Judgement of Noninfringement, or in the Alternative, Invalidity (D.I. 111).
Declaration of Stephanie P. Koh in Support of Defendants' Motion for Summary Judgement of Noninfringement, or in the Alternative, Invalidity (D.I. 112).
Notice of Request for Evidentiary Hearing on Technical Matter Relevant to Claim Construction (D.I. 109).
Markman Hearing, In the Matter of *Ambit Corporation v. Delta Air Lines, Inc. and Aircell LLC*, Nov. 19, 2009.
Defendants' Third Amended Disclosure of Claim Terms to be Construed and Their Respective Proposed Constructions.
Defendants' Fourth Amended Preliminary Invalidity Contentions.
ECF Notice of United States District Court, Electronic order Denying [122] Motion for Reconsideration.
Defendants' Reply in Support of Their Motion for Summary Judgement of Noninfringement, or in the Alternative, Invalidity (D.I. 132).
Defendants' Motion for Summary Judgement of Noninfrigement, or in the Alternative, Invalidity (D.I. 110).
Defendants' Motion for Reconsideration of the Courts Construction of "First RF Antenna" (D.I. 122).
Complaint, Jury Trial Demanded (D.I. 1).
Memorandum in Support of Defendants' Motion for Reconsideration of the Court's Construction of "First RF Antenna" (D.I. 123).
Defendants' Local Rule 56.1 Statement of Material Facts as to Which there is no Genuine Dispute (D.I. 117).

Declaration of William R. Michalson (D.I. 134).
Declaration of William R. Michalson in Support of Defendant's Motion for Summary Judgement of Noninfringement, or in the Alternative, Invalidity (D.I. 116).
Declaration of William W. Archer in Support of Defendants' Motion for Summary Judgement of Noninfringement, or in the Alternative, Invalidity (D.I. 114).
Declaration of Thomas F. Hankinson in Support of Defendants' Motion for Reconsideration of the Court's Construction of "First RF Antenna" (D.I. 124).
Declaration of Patrick J. Walsh in Support of Defendants' Motion for Summary Judgement of Noninfringement, or in the Alternative, Invalidity (D.I. 115).
Declaration of Frances H. Phillips in Support of Defendants' Motion for Summary Judgement of Noninfringement, or in the Alternative Invalidity (D.I. 113).
Declaration of Benjamin P. Hurwitz, esq. in Support of Plaintiff's Opposition to Defendant's Motion for Summary Judgement of Noninfringement, or in the Alternative, Invalidity (D.I. 127).
Transcription of Motion Hearing, In the Matter of *Ambit Corporation v. Delta Air Lines, Inc. and Aircell LLC*, Jan. 20, 2010.
Plaintiff's Response to Defendants' Statement of Material Facts as to Which There Exist Genuine Issues to be Tried (D.I. 126).
Plaintiff's Memorandum in Opposition to Defendant's Motion for Summary Judgement of Noninfringement, or in the Alternative, Invalidity (D.I. 125).
Defendant's Second Amended Disclosure of Claim Terms to be Construed and Their Respective Proposed Constructions.
Memorandum and Order (D.I. 118).
Ambit Corporation's Reply to Counterclaims of Delta Airlines, Inc., (D.I. 19).
Defendant Delta Airlines, Inc.'s answer to Plaintiff's First Amended Complaint and Counterclaims (D.I. 13).
Dennis, T.L., *On the phone at 30,000 feet*, Aerospace America, Jun. 1985.
European Telecommunications Standards Institute, *ETR 056: Radio Equipment and Systems (RES); Digital European Cordless Telecommunications (DECT) System Description Document*, Jul. 1993.
Jahn A., et al., *Evolution of Aeronautical Communications for Personal and Multimedia Services*, IEEE Communications Magazine, Jul. 2003.
National Aeronautics and Space Administration (NASA), *National Space Transportation System Reference: Systems and Facilities*, vol 1, dated Jun. 1988 and published at least as early as Sep. 1988, pp. 415–426, 570–628.
Papavramidis, A.C. et al., *Adaptation of Land Mobile Systems for Onboard Operation*, 1993 Int'l Conf. on Universal Personal Communications, Oct. 15, 1993.
Patent Cooperation Treaty Publication WO94/28684, "Mobile Communication System", Palmgren, Dec. 8, 1994.
Woolnough, Roger, *U.K. Firm Develops Wireless Laptop, PDA Links*, Electronic Engineering Times, Oct. 25, 1993.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-21 are cancelled

* * * * *